UNITED STATES PATENT OFFICE.

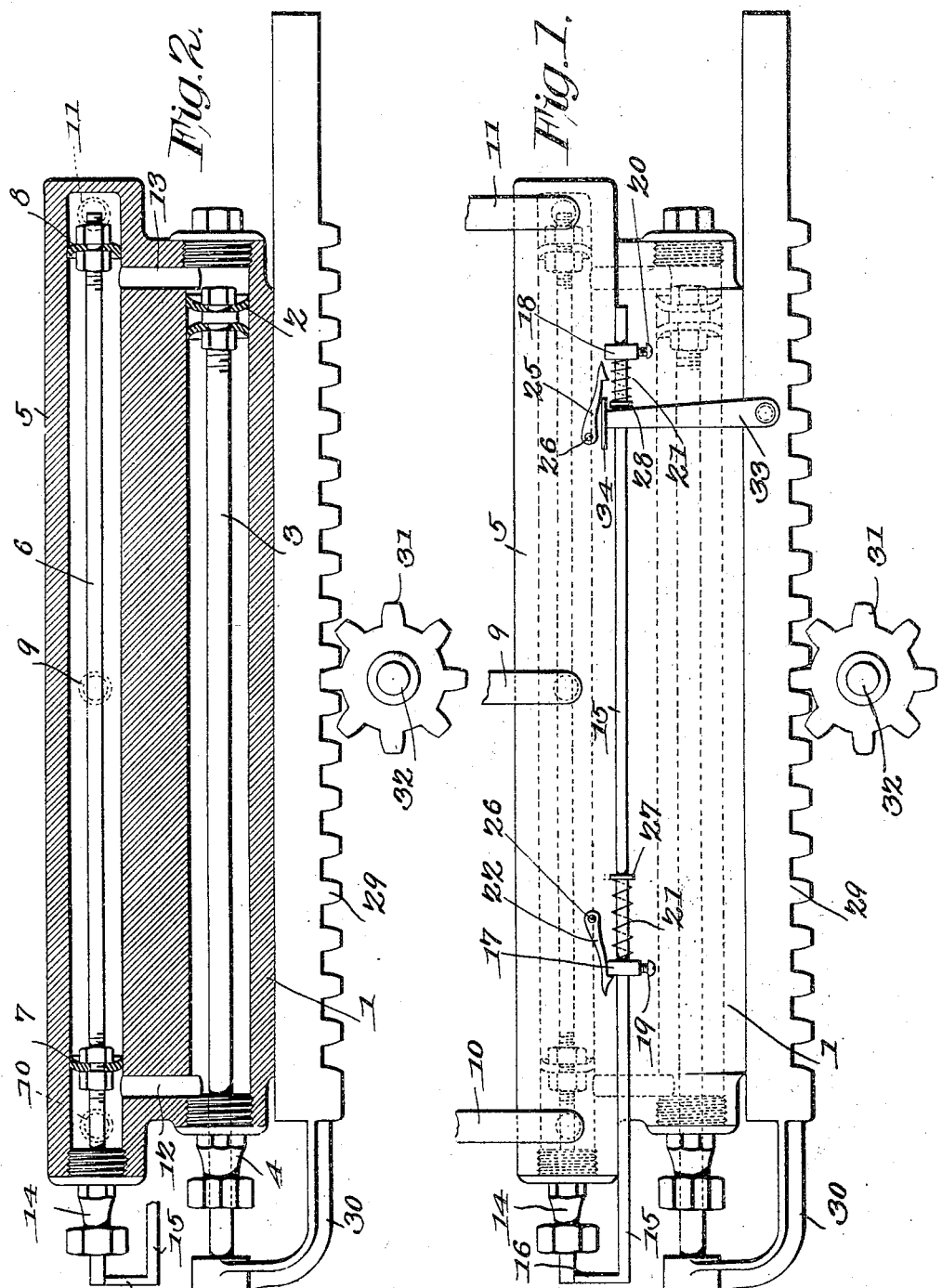

DAVID ANDERSON, OF LISBON, OHIO.

MOTOR.

No. 808,269.  Specification of Letters Patent.  Patented Dec. 26, 1905.

Application filed December 28, 1904. Serial No. 238,628.

*To all whom it may concern:*

Be it known that I, DAVID ANDERSON, a citizen of the United States, residing at Lisbon, in the county of Columbiana and State of Ohio, have invented a new and useful Motor, of which the following is a specification.

This invention relates to motors which include a reciprocating piston and a balanced valve, and has for its object to quickly and positively effect shifting of the balanced valve in a simple manner at the completion of each stroke of the piston.

With this object in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the accompanying drawings, Figure 1 is a plan view of a motor embodying the features of the present invention. Fig. 2 is a longitudinal sectional view thereof.

Like characters of reference designate corresponding parts in both figures of the drawings.

The present motor includes a cylinder 1, in which works a piston 2, having a piston-rod 3 working through a stuffing-box 4 at one end of the piston. A steam-chest 5 is supported externally upon the cylinder and includes a balanced valve made up of a stem 6 and opposite heads or pistons 7 and 8. The inlet 9 is at the center of the valve-chest, while the respective outlets 10 and 11 are at opposite ends thereof beyond the opposite limits of the stroke of the balanced valve. Ports 12 and 13 communicate between the valve-chest and the cylinder at the opposite ends of the latter. One end of the valve-stem projects through a stuffing-box 14 at one end of the steam-chest, and a valve-shifting rod 15, working externally of the valve-chest and cylinder and in substantial parallelism therewith, is connected to the projected end of the valve-stem by means of an arm or bracket 16. At predetermined intervals upon the rod 15 are fixed abutments or shoulders 17 and 18, preferably in the nature of collars, embracing the rod and fixed thereto by means of the set-screws 19 and 20. Helical springs 21 and 22 loosely embrace the rod between the abutments 17 and 18, with their outer ends respectively connected to said abutments, and thereby capable of being compressed against the abutments. Reversely-disposed dogs 22 and 23 are pivotally supported, as at 26, upon the exterior of the valve-chest with their free-headed ends projecting in opposite directions toward the respective ends of the valve-chest and designed to alternately gravitate into engagement with the outer sides of the respective abutments, so as to prevent endwise shifting of the rod when thus engaged. Suitable followers 27 and 28 are connected to the free ends of the springs and are slidably supported upon the rod 15. Power is transferred from the piston-rod by means of a rack 29, working in parallelism with the cylinder and terminally connected by an angular bracket 30 with the projected end of the piston-rod, there being a pinion 31 in mesh with the rack and mounted upon a shaft 32, which latter constitutes the drive-shaft of the motor, from which power may be taken in any suitable manner for any desired purpose.

In the operation of the motor any preferred motive power, preferably water, enters the chest 5 through the supply-pipe 9 and then passes into the cylinder—say, for instance, through the port 13—and operates to drive the piston 2 toward the left-hand end of the cylinder, the exhaust taking place through the ports 12 and 10. With the piston 2 at the right-hand end of the cylinder the dog 22 is in engagement with the shoulder or abutment 17, and the dog 25 is out of engagement with the abutment or shoulder 18, there being a tappet-arm 33, carried by the rack 29, with its outer end provided with a triphead 34, projected at opposite sides of the arm and in engagement with the dog 23 to hold the latter out of engagement with the shoulder 18. The tappet-arm is in engagement with the follower 28 and compresses the spring 21 against the abutment 18, and thereby holds the balanced valve at its right-hand limit. As the piston moves to the left the rack 29 and the tappet-arm 33 will likewise be carried to the left, and adjacent the limit of the left-hand stroke of the piston the tappet-arm 33 will engage the follower 27 and compress the spring 21 against the abutment 17, which is held against movement by the dog 22 until the head 24 of the tappet-arm engages the dog and trips the same from the abutment, whereupon the spring 21 will immediately expand, and thereby quickly and positively shift the balanced valve to its left-hand limit, so as to admit steam through the port 12, and hereby return the piston to the right-hand end of the cylinder. When the dog 22 is tripped from the shoulder or abutment 17 and the shifting-rod 15 is moved to the left, the other dog 23 will engage back of the shoulder or abutment 18, so as to hold the latter fixed to permit of the adjacent spring 21 being compressed against the abutment by the return movement of the tappet-arm 33, the head 34 of which trips the dog 23 and the spring expands to shift the rod 15 and the balanced valve to the right-hand side of the motor, this alternate shifting of the balanced valve continuing during the operation of the motor.

The particular advantage of the present manner of shifting the balanced valve is that the valve is not shifted immediately upon the engagement of the tappet-arm 33 with either of the followers 27 and 28, but is shifted only when one or the other of the dogs is released from the shifting-rod, and this releasing of the dog does not take place until the piston has reached its extreme limit, wherefore the shifting of the balanced valve is accurately gaged to take place at the completion of each stroke of the piston and not before, for the reason that the shifting-rod is not released until the piston has completed its stroke, and then the shifting of the valve is occasioned by the expansion of the spring in a very quick and positive manner and in a very simple and efficient manner.

Another advantage of the present device resides in the fact that the valve-shifting mechanism is located in close proximity to the cylinder and the valve-chest and operates between the ends thereof, the rack 29 constituting a part of the piston-rod for actuating the tappet-arm 33, whereby the present motor is assembled very compactly and is therefore particularly useful where space is an important item.

Having fully described the invention, what is claimed is—

The combination of a cylinder and a valve-chest in substantial parallelism and provided respectively with a piston and a balanced valve, a valve-stem having a return portion working at one side of the chest, a piston-rod having a return portion working at one side of the cylinder and provided with a rack, a pinion in mesh with the rack for transferring power, abutments carried by the return portion of the valve-stem, a helical spring embracing the return portion of the valve-stem and bearing against the inner faces of the respective abutments, dogs pivotally mounted upon the valve-chest for engagement with the respective abutments to limit the movement of the valve-stem, each dog having its swinging end extending toward the adjacent end of the valve-stem, and a tappet-arm carried by the return portion of the piston-rod and working between the abutments for alternate engagement with the springs, said tappet being provided with oppositely-disposed trip projections for successive engagement with the dogs to release the same from the respective abutments after compression of the respective springs by the tappet-arm.

In testimony that I claim the foregoing as my own I have hereto affixed my signature in the presence of two witnesses.

DAVID ANDERSON.

Witnesses:
ISSADORE FRANK,
N. M. DAVIS.